(12) United States Patent
Greenman et al.

(10) Patent No.: US 10,270,117 B2
(45) Date of Patent: Apr. 23, 2019

(54) MICROBIAL FUEL CELL

(76) Inventors: John Greenman, Bristol (GB); Andrea Ioannis Ieropoulos, Bristol (GB)

( * ) Notice: Subject to any disclaimer, the term of this patent is extended or adjusted under 35 U.S.C. 154(b) by 1063 days.

(21) Appl. No.: 14/003,882

(22) PCT Filed: Mar. 9, 2012

(86) PCT No.: PCT/GB2012/050537
§ 371 (c)(1),
(2), (4) Date: Nov. 1, 2013

(87) PCT Pub. No.: WO2012/120314
PCT Pub. Date: Sep. 13, 2012

(65) Prior Publication Data
US 2014/0057136 A1    Feb. 27, 2014

(30) Foreign Application Priority Data

Mar. 9, 2011    (GB) .................................... 1104046.6

(51) Int. Cl.
*H01M 8/16*    (2006.01)
(52) U.S. Cl.
CPC .............. *H01M 8/16* (2013.01); *Y02E 60/527* (2013.01)
(58) Field of Classification Search
CPC ................................. H01M 8/16; Y02E 60/527
See application file for complete search history.

(56) References Cited

U.S. PATENT DOCUMENTS

| 4,255,241 | A | * | 3/1981 | Kroon | ................ | C23F 31/02 |
| | | | | | | 204/196.33 |
| 6,475,653 | B1 | * | 11/2002 | Gomez | ................ | H01M 4/86 |
| | | | | | | 429/105 |
| 7,695,834 | B1 | | 4/2010 | Borole | | |
| 2003/0138698 | A1 | | 7/2003 | Lee et al. | | |
| 2007/0048577 | A1 | | 3/2007 | Ringeisen et al. | | |
| 2009/0305084 | A1 | | 12/2009 | Crookes et al. | | |
| 2010/0003543 | A1 | | 1/2010 | Zhou | | |
| 2010/0151279 | A1 | | 6/2010 | Logan et al. | | |

(Continued)

FOREIGN PATENT DOCUMENTS

| CN | 101908635 A | 12/2010 |
| JP | 61269866 A * | 11/1986 |

(Continued)

OTHER PUBLICATIONS

Zhuang, L. and S. Zhou, "Substrate cross-conduction effect on the performance of serially connected microbial fuel cell stack", Electrochemistry Communications, vol. 11, pp. 937-940, Feb. 26, 2009.*

(Continued)

*Primary Examiner* — Sarah A. Slifka
*Assistant Examiner* — Lilia Nedialkova
(74) *Attorney, Agent, or Firm* — Stites & Harbison, PLLC; Mandy Wilson Decker

(57) ABSTRACT

The present invention provides an arrangement of microbial fuel cells (MFCs) in which the MFCs are in discontinuous flow communication, methods of operating such an arrangement, methods of hydrogen production and electrical production using such an arrangement, a digester for use in the arrangement and methods of increasing power output from the arrangement.

18 Claims, 11 Drawing Sheets

(56) References Cited

U.S. PATENT DOCUMENTS

| | | | | |
|---|---|---|---|---|
| 2010/0200495 | A1* | 8/2010 | Borole | C02F 3/005 210/601 |
| 2012/0082869 | A1* | 4/2012 | Rittmann | C12N 13/00 429/2 |
| 2012/0308856 | A1* | 12/2012 | Horne | H01M 8/04201 429/72 |
| 2012/0308909 | A1* | 12/2012 | Backstrom | H01M 8/249 429/451 |
| 2013/0137000 | A1* | 5/2013 | Bretschger | C02F 3/005 429/401 |

FOREIGN PATENT DOCUMENTS

| | | |
|---|---|---|
| WO | 2010/042987 A1 | 4/2010 |
| WO | 2010049936 A1 | 5/2010 |
| WO | 2010147683 A1 | 12/2010 |

OTHER PUBLICATIONS

Seo, H.N., et al. "Electricity Generation Couple with Wastewater Treatment Using a Microbial Fuel Cell Composed of a Modified Cathode with a Ceramic Membrane and Cellulose Acetate Film", J. Microbiol. Biotechnol., vol. 19, issue 9, pp. 1019-1027, Jun. 5, 2009.*

English translation of Japanese Patent Document JP 61269866, published Nov. 29, 1986.*

Park, D.H. and J.G. Zeikus, "Improved Fuel Cell and Electrode Designs for Producing Electricity from Microbial Degradation", Biotechnology and Bioengineering, vol. 81, pp. 348-355, Feb. 5, 2003.*

"Anaerobic Digestion Basics", Office of Energy Efficiency & Renewable Energy, Department of Energy, Aug. 2013.*

Logan, B.E., et al. "Microbial Fuel Cells: Methodology and Technology", Environmental Science and Technology, vol. 40, pp. 5181-5192, Jul. 14, 2006.*

"Ozonation", Southern Nevada Water Authority, Web. Accessed Sep. 28, 2016.*

Jiang et al., 2011, A pilot-scale study on utilizing multi-anode/cathode microbial fuel cells (MAC MFCs) to enhance the power production in wastewater treatment, Int. J. Hydrogen Energy, 36: 876-884.

Scott and Murano, 2007, A study of a microbial fuel cell battery using manure sludge waste, J. Chem. Technol. Biotechnol. 82: 809-817.

Ieropoulos et al., 2010, Improved energy output levels from small-scale Microbial Fuel Cells, Bioelectrochemistry 78: 44-50.

Ieropoulos et al., 2008, Microbial fuel cells based on carbon veil electrodes: Stack configuration and scalability, International Journal of Energy Research.

Galvez et al., 2009, Landfill leachate treatment with microbial fuel cells; scale-up through plurality, Bioresource Technology 100: 5085-5091.

Woodward et al., 2009, Maximizing power production in a stack of microbial fuel cells using multiunit optimization method, American Institute of Chemical Engineers Biotechnol. Prog., 25: 676-682.

Moqsud et al., 2010, Bio-Electricity generation by using organic waste in Bangladesh, Proc. of International conference on Environmental Aspects of Bangladesh (ICEAB10), Japan.

European Patent Office, Search Report and Written Opinion in PCT/GB2012/050537, dated Jun. 11, 2012.

Ieropoulos et al., 2010, Effects of flow-rate, inoculum and time on the internal resistance of microbial fuel cells, Bioresource Technology 101: 3520-3525.

* cited by examiner

Polarisation experiment for an MFC with 41% (w/v) copper coating on the open to the air carbon veil electrode.

a.

b.

a.

b.

MICROBIAL FUEL CELL

FIELD OF INVENTION

The present invention relates to microbial fuel cells (MFCs), to arrangements of MFCs, and to methods of operation of MFCs. In particular, the invention relates to the use of MFCs in applications such as the treatment of wastewater.

BACKGROUND TO THE INVENTION

MFCs are well established, being bio-electrochemical transducers that convert biochemical energy to electrical energy. They convert the chemical energy of organic feedstock into electricity using micro-organisms, which act as biocatalysts. The basic principle of operation, i.e. the extraction of electrons from an aqueous fuel source and their transfer onto electrode surfaces, has certain similarities to a conventional fuel cell.

MFCs commonly comprise a body, an anodic chamber, an anode, a cathode, a proton exchange membrane (PEM) window, an anodic fluid input and an anodic fluid output. The MFCs can be fed in a variety of ways, from manual periodic or automatic periodic (using simple mechanical valves), to a continuous flow into and between individual MFCs in an array. Generally, the anodic chamber is sealed to the outside with the exception of the PEM window, a conducting wire to the anode, which is sealed through the body of the vessel, and the anodic input/output tubes, which are sealed to the outside world but do connect the MFC units together.

MFCs represent a promising technology for sustainable energy production and waste treatment. They can extract energy from a fuel source such as wastewater by exploiting microbial communities in the anodic compartment that metabolise organic components in the feedstock. Electrons generated from these reactions travel through an externally connected circuit, from the anode to the cathode, thus producing a charge or current flow. Protons and electrons combine at the cathode, reducing oxygen to water. There are a number of limiting factors that influence energy generation and performance of a MFC. These include the rates of fuel oxidation and electron transfer to the anode by the microbes, the migration of protons to the cathode through the PEM and the oxygen supply and reduction reaction at the cathode.

Most existing systems involve either a single MFC with multiple anodes and cathodes, or a stack of MFCs that are securely and mechanically joined together, but that are not fluidically isolated, such that individual MFCs cannot be removed from the stack. This may be inefficient, as different fuel sources may need different lengths of time or bacterial communities to ensure that the feedstock is completely broken down. A degree of flexibility in the arrangement of the MFCs or electrodes is therefore favourable.

The water industry is energy intensive and consumes about 3% of the total energy used in the UK. The industry is responsible for approximately four million tonnes of greenhouse gas emission ($CO_2$ equivalent) every year and although this only accounts for less than 1% of total UK emissions, the amount is rising year on year. Water and energy management are inter-related issues; the energy required to treat wastewater is high and the ongoing tightening of water quality standards will lead to increases in energy usage. The local and global environment would benefit from reduced energy usage and increased water quality. There is a clear un-met need for technologies that can reduce energy usage during wastewater treatment.

As noted above, one of the major applications of MFCs is in the clean up of waste, such as that derived from bioenergy generation, compost, municipal waste, food and biological waste, landfill leachate, and wastewater. Another potential application is power generation for low-power requiring systems, electronics, laptops, LEDs, small sensors, microprocessors, wristwatches, clocks, calculators, DC motors that drive fans, wheels of toys/robots, charging small devices such as mobile phones and i-Pods, charging larger devices such as laptops, DC-operated refrigerators/freezers and USB powered microscopes. Alternatively, MFCs could be used to recharge the internal batteries of said devices.

As well as being environmentally friendly, MFCs have low manufacturing costs and the production of energy by MFCs has the potential to be continuous over months or years. Current MFCs provide high substrate to electricity conversion efficiencies, but have low energy transformation rates (Ieropoulos et al., 2008). The typical sustainable voltage output from a MFC with a 25 millilitre anodic chamber with an oxygen-diffusion cathode and plain carbon veil electrodes is of the order of 0.5 V (open circuit). Higher open-circuit values of 1 V have been reported from individual MFCs under special conditions, which are closest to the theoretical maximum of 1.14 V. Thus, in order to produce sufficient voltage (1.5 V) and/or power to reside within the operating range of silicon-based circuitry, it is necessary to either scale up one single unit (but this cannot increase voltage) or to connect multiple units together.

As the maximum electrical power output of a MFC is directly proportional to the substrate utilisation rate of the organic material in the feedstock, all the mechanisms to increase power output of a stack of MFCs are automatically transferable to the rate and efficiency of the system for transforming organic waste into less harmful liquid outputs. The two potential applications listed above are therefore closely linked, and improving the efficiency of one application is likely to improve that of the other.

The electrodes in a MFC can be made of a variety of materials. The electrodes must have a high conductivity and a high surface area for bacterial colonisation, as well as high porosity to reduce diffusion limitations. For these reasons, carbon-fibre veils are often used.

PEMs can also be made from a variety of materials. Different materials have different properties, with some being more susceptible to polarity reversal, and others being better at preventing the flow of certain cations. This can be important for certain applications in which only hydrogen ions are needed to reach the cathode, though this is not as applicable for wastewater treatment.

The materials used to make the body of the MFC itself can vary depending on the application, but plastics, ceramics, soft polymers and coated metal alloys are often used. Plastics materials will be mainly of the thermo-plastics category, as these are cheap and rapidly manufactured on a large scale.

As mentioned above, it has been shown that a means to optimise power output (and thus 'waste' utilisation) is via multiple smaller MFCs that are connected together, rather than larger individual cells (Ieropoulos et al., 2008). However, there is still debate within the field on this point, with some believing that larger cells, that may also include multiple electrodes in a single cell, are better (Jiang et al., 2011 and Scott et al., 2007). Connecting multiple smaller MFCs has the advantage that the number of smaller MFCs can be changed with changing requirements. In order to increase power output in existing MFC stacks, cells have been connected in series, with a continuous flow of fluid feedstock running between each cell.

There are many examples of arrangements of multiple MFCs connected in series (see for example WO2010/049936, US2007/0048577 and US2010/0003543). However, in the arrangements disclosed in these documents, the MFCs are in liquid communication and so are fluidically connected. It has been shown that when MFCs are fluidically connected, the maximum power cannot be obtained. Ieropoulos et al., 2008 demonstrated that the voltage was 3-fold higher in isolated MFC stacks than in fluid-linked stacks. This difference may be due to high shunt losses that are incurred by a "short-circuit" phenomenon. This phenomenon occurs when the MFCs are electrically connected in series (to step-up the voltage), but the fluidic link joining the MFCs together is opposing that, bringing the units into the equivalent of a parallel connection. This results in a lower than expected voltage output. The shunt losses may be reduced by connecting the cells in a series/parallel manner, but they are not eliminated. The losses are even greater when the fluid medium has high levels of salt electrolytes.

Fluid connectivity can also lead to polarity reversal, which in turn reduces the power output of the cell (Ieropoulos et al., 2010). Polarity reversal in a stack is caused by the fact that defective MFC units develop a higher internal resistance than the other MFCs in the stack. This can be the result of starvation, heavy loading, but more often it is the result of a fouled membrane. In this situation, the solution in the anodic chamber becomes less negatively charged. If the load connected between the anode and the cathode is of sufficiently low resistance to allow the flow of the now scarce electrons at very low rates, this further reduces the negativity of the anode. This has a detrimental effect on the power output of the arrangement.

Copper plating of the cathode in a MFC has been shown to increase the conductivity of carbon electrodes, as well as having other beneficial effects. US 2010/0151279 discloses the use of copper plated cathodes in MFCs. However, this patent publication relates to a single MFC, and does not mention or suggest the possible effects of copper when multiple MFCs are connected together. Copper is also only mentioned as one of the many potential coating materials to enhance a desired reaction at the cathode. US2010/0151279 provides no evidence that copper was tested as a coating material, or that it increases power output.

SUMMARY OF THE INVENTION

The present invention relates to an arrangement of MFCs in which the MFCs are in discontinuous flow communication. Preferably, the arrangement comprises an electrical insulating material disposed between each MFC, which inhibits the flow of electrons through the fluid and thereby disrupts the fluidic flow communication. Preferably, this arrangement is a cascade arrangement, in which the outflow from an anodic chamber in one MFC flows into the anodic chamber of the next MFC in the cascade arrangement.

In a preferred embodiment, the electrical insulating material is a gas-gap. The layer of gas can be created by a weir overflow that is placed below the top of the anodic chamber. When a volume of fluid enters the anodic chamber, the new fluid will displace an equal volume of fluid via the weir tube. This fluid then enters the next MFC in the cascade arrangement, displacing fluid from the anodic chamber of that MFC. This ensures that there is always a layer of gas present at the top of each anodic chamber. In one embodiment, the gas is air. This creates fluidic isolation of each MFC during the time that the fluid is not moving between MFCs.

In a further preferred embodiment, the MFCs in the arrangement are pulse fed. This creates defined periods of time in which the fluid is not moving between anodic chambers and so the anodic chambers are fluidically isolated. The pulse duration and frequency, and thereby also the isolation duration and frequency, can be adjusted to maximise efficiency, for example to treat very dilute substrates. Preferably, around 50% of the fluid in the anodic chamber is replaced in a few seconds, every few hours.

In another preferred embodiment, the cascade arrangement is gravity fed, thereby reducing the energy needed to move fluid from one MFC to another. In further embodiments, the arrangement may be powered by wind power or electrical power.

The cathodes may be open or closed, or a mixture of cathodes can be used, depending on the system requirements and the environmental conditions. Open cathodes are preferably kept moist using a drip feed, preferably using rainwater. Rainwater may be supplied from a water head at the top of the cascade. The rate of the drip feed may be adjusted to account for evaporative loss and the humidity in the atmosphere, though it is normally set as low as possible to ensure that the cathodes are kept moist without stagnation and to ensure that the drip feed comprises discrete droplets rather than a continuous flow.

Copper coated cathodes may also be used in at least one MFC, in order to increase the power output. Electro-plating with copper is relatively easy to do, effective and relatively cheap. The concentration of copper can be adjusted to optimise the power output. Concentrations of about 5% to about 60% w/v of the catalyst coating can be used, preferably about 10% to about 50% w/v of the catalyst coating, more preferably about 30% to about 45% w/v (mg/ml) of the catalyst coating and in preferred embodiments of the invention a copper concentration of about 40% w/v of the catalyst coating is used.

In a preferred embodiment of the invention one or more ion exchange membranes are used in at least one MFC. The ion exchange membrane may be a cation exchange membrane or an anion exchange membrane. Suitable ion exchange membranes also include Hyflon® ion membranes, synthesized collagen films, synthesized latex films and animal skin films. Preferably the ion exchange membrane is a proton exchange membrane (PEM). The PEM may be a polymer membrane or a composite membrane and suitable materials include, but are not limited to, Nafion®, Ultrex™, ceramic and earthenware. Preferably, the PEM is ceramic. The shape and arrangement of PEMs used in the MFCs of the present invention can vary depending on the design of the individual MFCs, however, when the PEM is ceramic a flat tile or a hollow cylindrical construction is preferred. When the PEM is cylindrical the anode can be inserted inside the cylinder and the cathode can be wrapped around the exterior of the cylinder.

Preferably, the arrangement according to the invention can be scaled up, either by increasing the number of MFCs in each cascade, or by increasing the number of cascades deriving from a single feedstock reservoir. This can ensure that a substrate is entirely removed if the substrate is very dilute, or can be used to treat a substrate of higher concentration with concomitant higher energy production. The individual MFC units can be of a modular design so that units can be mechanically latched to slot into each other in order to scale up the cascade arrangements.

It is known that mixed microbial communities outperform monocultures. The mixed microbial community may be varied down the cascade arrangement according to the present invention, so that the upstream MFCs in the cascade arrangement have different microbial communities to those further downstream. Preferably, more efficient aero-tolerant microbes will be present further upstream in the cascade arrangement (where the influent substrate has a higher oxygen concentration), while more efficient anaerobic microbes will be present further downstream. A mixed community is more efficient at utilising a feedstock comprising a variety of compounds, while individual species are better at breaking down specific compounds. The communities may also be changed depending on the main substrates in the feedstock.

Monocultures may be preferable for some applications, for example when attempting to clean and/or produce energy from a specific type of known feedstock. The communities or monocultures may also be different in different regions of the stack depending on the application and a microporous filter could be employed to ensure that a particular community or monoculture is not changed by bacteria entering from MFCs higher up the cascade.

The invention also provides a method for breaking down large compounds upstream in the cascade arrangement by including bacterial communities that more efficiently break down larger compounds upstream in the cascade arrangement, so that the feedstock can be more efficiently utilised by the downstream bacterial communities.

The present invention also provides an arrangement of MFCs that includes a digester for breaking down larger compounds, particulates and solids. This digester acts to break down the larger molecules, particulates and solids in the organic feedstock into smaller molecules, which are then more efficiently broken down in the MFC arrangement. The inflow into the digester can either be from the feedstock reservoir itself, before the feedstock has passed through the MFC cascade arrangement, or it can be from one of the MFCs in the cascade, when the concentration of larger molecules will be higher. The output can then flow out of the digester via a weir overflow, which leads to a MFC in the cascade arrangement. This allows more efficient digestion.

Preferably, a mixed community is also used in the digester to increase the efficiency of the digestion. This community is preferably also efficient at breaking down larger molecules. More preferably, this community is more efficient at breaking down larger molecules than the communities present in the MFC cascade. Preferably, a means is provided that allows the mixing of the feedstock within the digester.

The cascade arrangement also preferably has an automated controller for dynamically adjusting factors such as load, flow rate and the connection of more MFCs in either series or parallel, for maintaining maximum power transfer and maximum energy abstraction conditions.

The invention also provides a method of removing potentially harmful compounds from waste comprising passing the waste through a cascade arrangement according to the present invention. A method of electrical power generation comprising passing a fuel source through a cascade arrangement according to the present invention is also provided. The fuel source may be urine, sewage or food waste. Preferably, potentially harmful compounds are also removed. This method could be adapted to make use of toilets as a reservoir for feedstock.

By generating electrical power from food waste, urine or sewage, energy can be gained from a fuel source that would otherwise not be used. The removal of potentially harmful products means that any waste that is not utilised in the MFC cascade according to the present invention can be safely discarded.

Also provided is a method of hydrogen production, comprising passing waste through a cascade arrangement according to the present invention and collecting the hydrogen that is produced. Preferably, the cathode half-cell is enclosed and is devoid of oxygen. There is also preferably a specific mechanism for the collection of hydrogen included in the arrangement.

The present invention also provides a digester for use in a MFC cascade in order to increase the efficiency of the breakdown of organic molecules. Preferably, this digester includes perfusion matrix biofilms and a stomach. The digester also preferably comprises a mixed bacterial community, which is efficient at breaking down large molecules. In a further embodiment, the environment within the digester can be controlled so as to maximise factors such as bacterial growth rate and enzyme production.

Preferably, the digester is gravity fed so as to decrease energy consumption. More preferably, the digester stomach is flexible, so as to allow mixing of the feedstock, as well as control of the height of the weir overflow. A method of mixing the feedstock so as to increase digestion rate is also provided. Even more preferably, the digester is transparent, so that sedimentation can be monitored.

Also provided is a method of maximising the efficiency of the hydrolysis of molecules in a MFC arrangement according to the invention by selecting for specific bacterial species. This can be done by creating mixed bacterial communities on perfusion matrix biofilms. The matrix can also be an electrode. Those species that grow best on the biofilm will filter into the digester, thereby maximising the efficiency of the digester itself. Selection can also be carried out by feeding the bacterial community on large compounds only, as those species that are efficient at breaking down large compounds will out-compete those that are not. Further rounds of biofilm selection may be used to further optimise the bacterial community. A perfusion matrix biofilm that can be transplanted from one digester to another, so as to start a new community, is also provided.

A method of increasing power output of a MFC arrangement according to the present invention, comprising pre-digesting a feedstock that is to be passed through the MFC arrangement, using the digester is also provided. There is also provided a method of removing larger compounds from the feedstock, comprising pre-digesting the feedstock in the digester, and then passing the feedstock back into the MFC arrangement of the present invention.

BRIEF DESCRIPTION OF THE DRAWINGS

Embodiments of the invention will now be described, by way of example only, with reference to the accompanying drawings FIGS. 1 to 11, of which.

DESCRIPTION

A Microbial Fuel Cell

Figure 1:
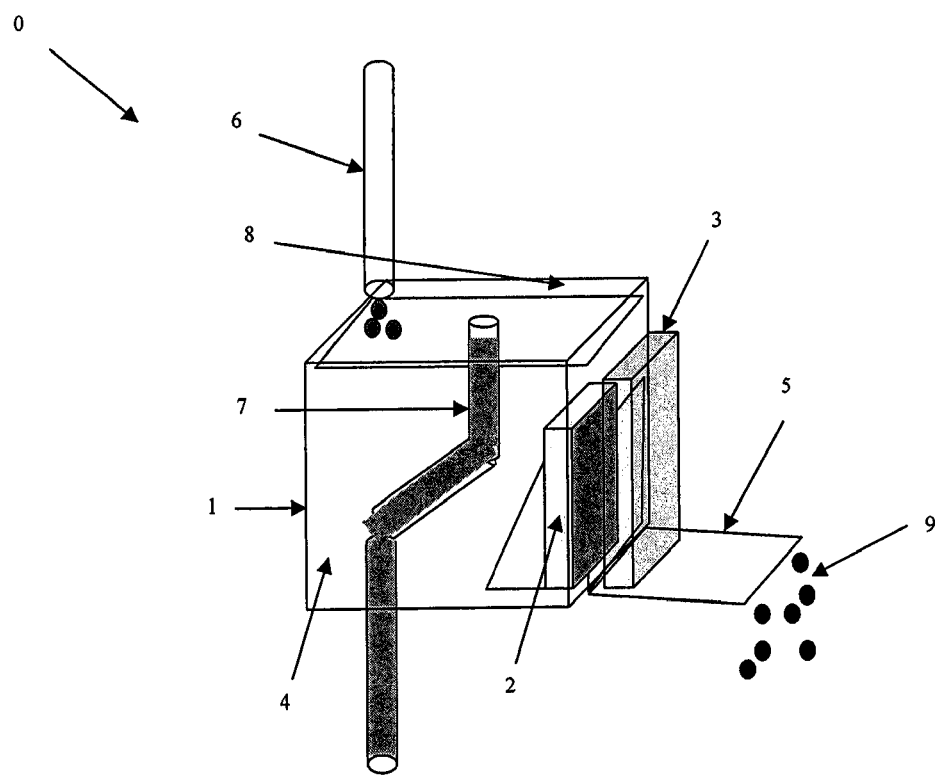
FIG. 1 is a schematic drawing of a MFC used in an arrangement in accordance with the invention.

FIG. 1 shows a MFC 0, comprising a body 1 made of a plastics material, a carbon veil anode 2, a carbon veil cathode 3, an anodic chamber 4, a cathode fluid drip tray 5 and an inlet tube 6. Within the anodic chamber 4 is a weir tube 7, that helps to create a layer of electrical insulating material 8 at the top of the anodic chamber 4. In this case, the electrical insulating material is air. The MFC 0 is part of a stack of similar MFCs (not shown) which are arranged in a cascade so that fluid can flow from one MFC to another, down the cascade.

In operation, fluid feedstock, such as wastewater, enters the anodic chamber 4 from the inlet tube 6. The inlet tube 6 may lead either from a feeder reservoir or from the previous MFC in the cascade. The anodic chamber 4 fills with fluid until the fluid level reaches the level of the weir tube 7. The fluid then escapes from the anodic chamber 4, down the weir tube 7 and into the next MFC in the cascade or into a waste fluid output, thereby creating a layer of electrical insulating material 8 (in this case air) at the top of the anodic chamber 4. Preferably, the anodic chamber 4 is pulse fed, so that a certain volume of fluid enters via the inlet tube 6 and displaces the same volume of fluid via the weir tube 7.

The carbon veil cathode 3 is on the outside of the MFC 0 and is kept moist by a fluid drip feed 9. This fluid may be rainwater in the case of treatment wastewater, and may come from a reservoir or from the MFC above the MFC in question in a stack of MFCs. The rate of the fluid drip feed 9 can be adjusted so that it comprises individual droplets and is not a continuous stream of water. The fluid drip feed 9 runs down the carbon veil cathode 3 and onto the cathode fluid drip tray 5. From the cathode fluid drip tray 5, the fluid drip feed 9 then drips onto the carbon veil cathode of the next MFC in the cascade arrangement.

A Cascade Arrangement of Microbial Fuel Cells

Figure 2:
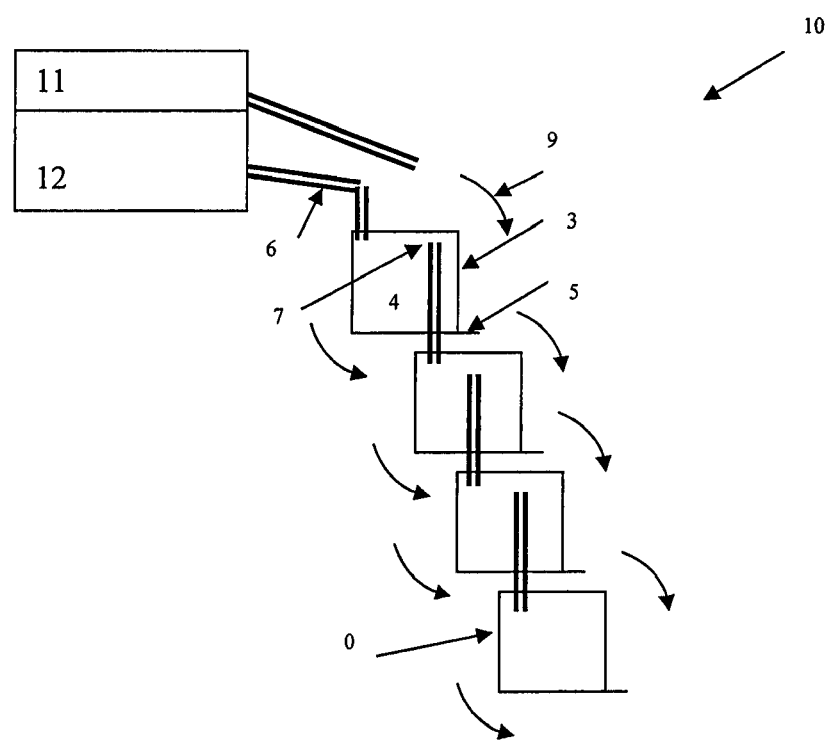
FIG. 2 is a cross-section of a cascade arrangement of multiple MFCs, in accordance with the invention.

FIG. 2 shows the cascade arrangement 10 including the MFC 0 of FIG. 1. The cells are arranged on an incline and are thereby gravity fed. At the top of the cascade are a water header tank 11 and an organic feedstock reservoir 12. The water header tank 11 provides the fluid drip feed 9 in order to keep the carbon veil cathode 3 moist. As shown in FIG. 1, the fluid drip feed 9 runs from the water header tank 11, down the carbon veil cathode 3 and onto the cathode fluid drip tray 5, from which it drips onto the next MFC in the cascade arrangement.

The organic feedstock reservoir 12 feeds organic feedstock into the anodic chamber 4 of the MFC 0 via the inlet tube 6. The fluid level in the anodic chamber 4 rises until it reaches the weir tube 7. The fluid then flows down the weir tube 7, powered by gravity, into the anodic chamber 4 of the next MFC in the cascade arrangement 10.

The top MFC in the cascade is pulse fed from the organic feedstock reservoir 12. The pulse feed frequency and volume is set by the operator, using a tap or valve. The tap or valve may be controlled using water gravity power, wind power or electrical power generated by the MFC arrangement. For example, 50% of the anodic volume may be quickly replaced every few hours with a plug volume of feedstock taking only seconds to pulse and flow into place.

When the pulse of fluid feedstock is given to the upstream MFC, it will mix, displace or exchange an equal volume of pre-existing fluid in the anodic chamber via the weir overflow. The level of fluid is set by the position of the weir. It is set to leave a layer of gas between it and the top of the anodic chamber, as shown in FIG. 3.

Figure 3:
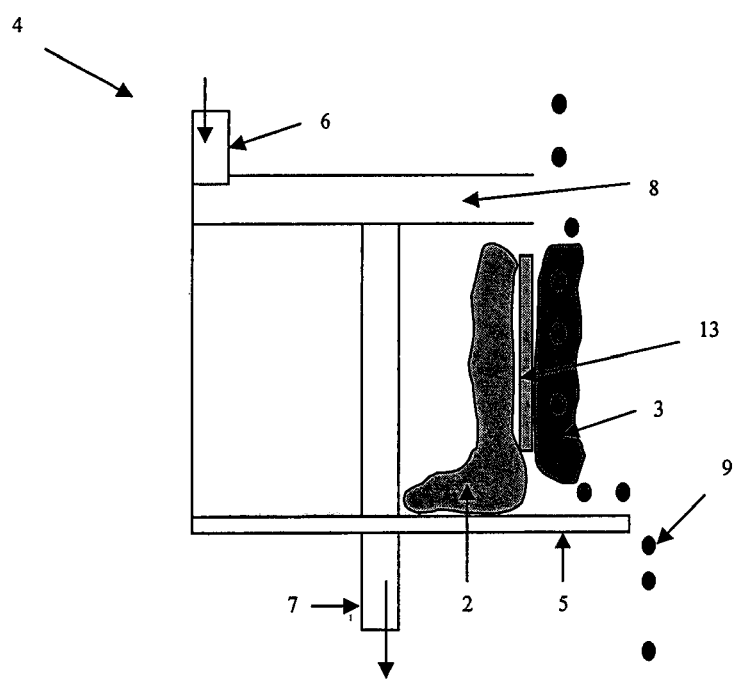
FIG. 3 is a schematic view of the anodic chamber of the MFC of FIG. 1, with a gas trap and weir, a PEM and an air cathode.

FIG. 3 is a schematic diagram of the anodic chamber 4 of a MFC, showing the inlet tube 6, the layer of electrical insulating material 8, the weir tube 7, the carbon veil anode 2, the carbon veil cathode 3, the cathode fluid drip tray 5 and the fluid drip feed 9, in more detail. FIG. 3 also shows the position of a PEM window 13. Water continually drips over the cathode on the outside of the fuel cell. The drip tray 5 (angled slightly down and away) helps to ensure that the down flow is indeed by discrete droplets rather than a continuous fluid flow. The flow rate may be increased to account for evaporative loss, or decreased if the atmosphere is humid or wet (e.g. raining).

The anodic chamber 4 is sealed to the outside with the exception of the PEM window 13, the input/output tubes (which are still sealed to the outside world but do connect the MFC units together) and the conducting wire to the carbon veil anode 2 (which is sealed through the wall of the vessel). Therefore, (with the exception of short periods of fluid movement during the short feed) there is a considerable time period (typically many hours) when the MFC units are fluidically isolated with gas gaps between all units. This mitigates the flow of electrons by fluidic conductance between units.

Cascade Arrangements of Microbial Fuel Cells

Electrode outputs can be joined in series in order to boost voltage and in parallel in order to boost current. To more efficiently break down a substrate to ensure that it is more entirely removed, or to treat very dilute substrates, either the number of MFCs in the cascade arrangement can be increased or the rate of pulse feeding can be reduced (so that the MFCs have a longer hydraulic retention time in which to utilise available feedstock before it is moved down the cascade). Depending on the type of feedstock being utilised, the arrangement can be expanded by elongation of the cascade (increasing numbers of MFCs per cascade) or increasing the numbers of such cascades from the original feedstock reservoir.

Figure 4:
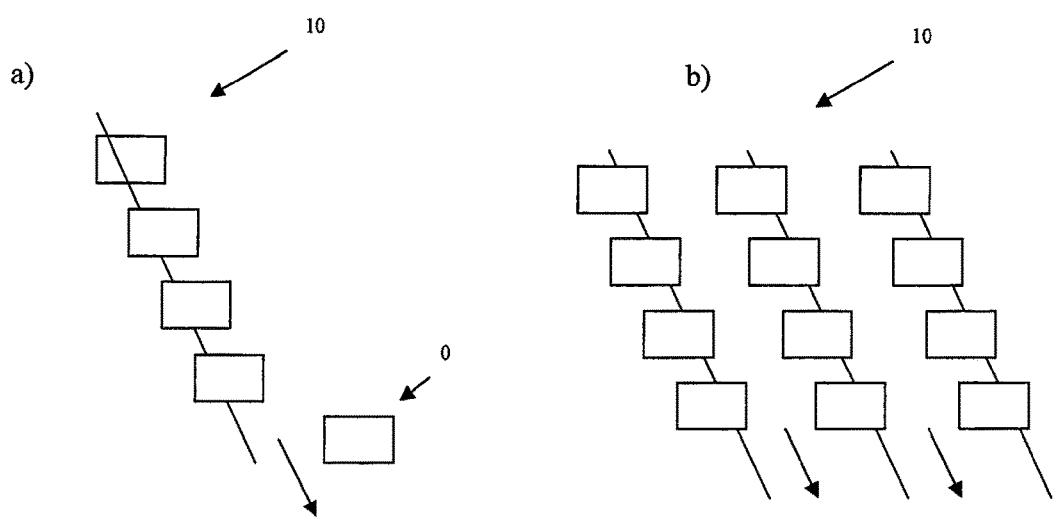
FIG. 4 is a diagram showing the ways in which the cascade arrangement of FIG. 2 could be scaled up.

FIG. 4 shows how the cascade arrangement 10 of the MFCs of FIG. 1 can be scaled up. In FIG. 4a, the cascade arrangement 10 is scaled up by adding additional MFCs 0 at the bottom of the cascade arrangement 10. FIG. 4b shows the cascade arrangement 10 being scaled up by the addition of further cascade arrangements that all derive from a single header tank. In FIG. 4b, the cascades are normally shorter than in FIG. 4a.

Copper Coated Cathode

Figure 5:
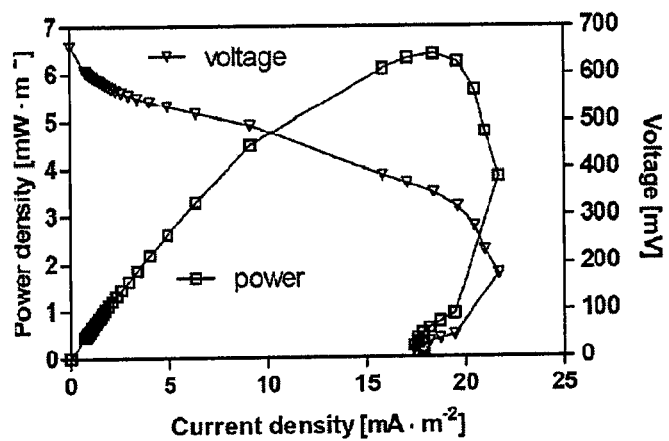
FIG. 5 is a graph showing how power density and voltage vary with varying current density in a single MFC with a copper coating on the open carbon veil electrode.

FIG. 5 shows how the voltage and power density vary with changing current density. The experiment was carried out in a MFC, with a copper coating on the carbon veil cathode. The graph shows that under the same electrical load conditions, copper produced at least twice as much power as any of the other catalysts tested, thereby demonstrating its suitability as a coating material.

Figure 6:
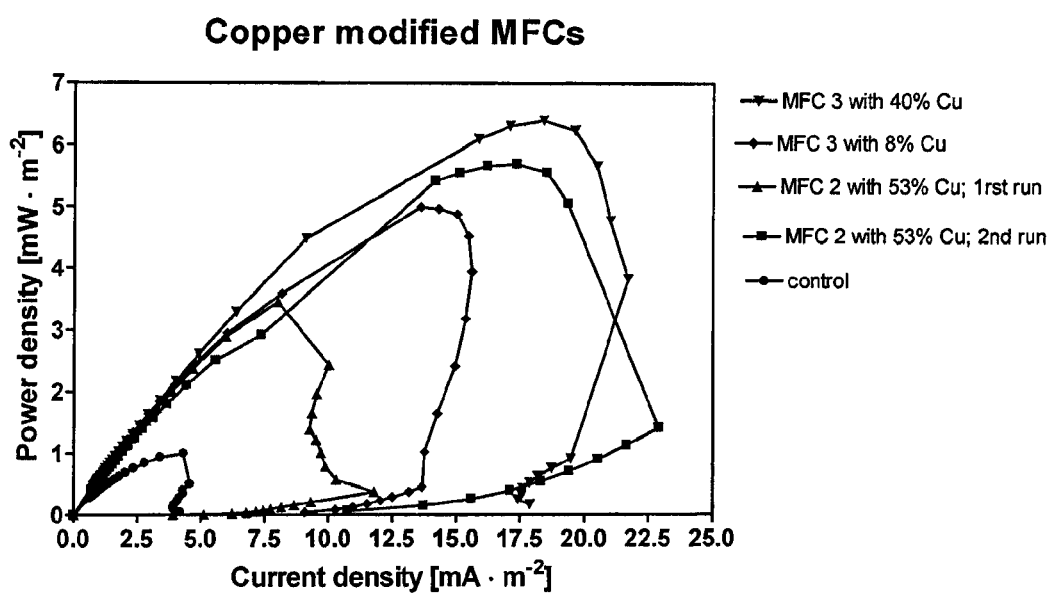
FIG. 6 is a graph showing power curves produced from polarisation experiments, using identical MFCs but different copper concentrations shown as % w/v as catalyst coatings on the cathode.

FIG. 6 shows power curves produced from polarisation experiments, using identical MFCs but different copper concentrations as catalyst coatings on the cathode. This graph indicates an optimum copper concentration, and that the power output with 8% (w/v) of the catalyst coating copper and 53% (w/v) of the catalyst coating copper is similar.

Digester

Figure 7:
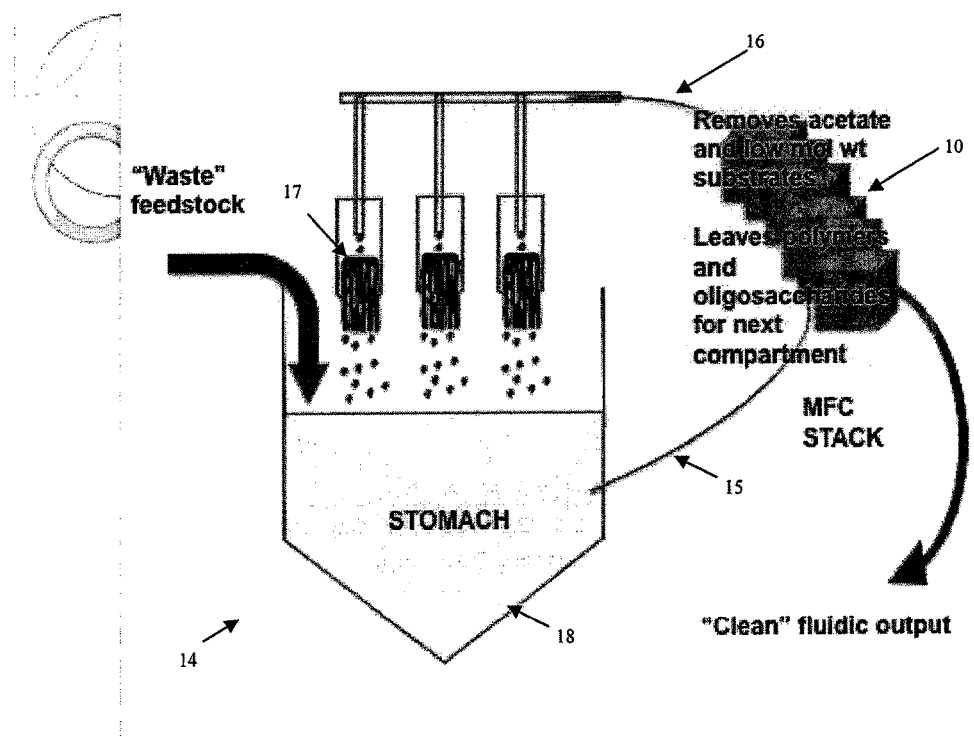
FIG. 7 is a schematic view of a digester that can be incorporated into the cascade arrangement of FIG. 2.

FIG. 7 shows a digester 14 for use in the cascade arrangement 10 comprising a stomach 18, an input 16, an output 15 and a perfusion matrix biofilm 17. The output 15 of the stomach 18 can preferably then be fed into the cascade arrangement 10 via a weir overflow in order to increase power output, as the larger molecules that are harder to break down in a MFC will already be partially digested. The input 16 into the stomach 18 can either be from the feedstock reservoir, before the feedstock has passed through the cascade arrangement 10, or it can be from one of the MFCs in the cascade, when the concentration of larger molecules will be higher. The output 15 can then be passed back into the cascade arrangement 10 for more efficient digestion.

Mixed microbial communities are innoculated on a perfusion matrix biofilm 17, and the organic feedstock is passed over the biofilms 17. The matrix 17 can also be an electrode. Those species of bacteria that grow best using the feedstock as a fuel source are shed from the biofilm 17 at a higher rate than the minor species that are less functional. These species are then used in the stomach 18, in order to partially digest the feedstock, so that the digestion in the cascade arrangement 10 is more efficient, thereby increasing the power output of the cascade itself. The environment of these biofilms 17 can be carefully controlled to maximise growth rate and enzyme productivity. One can also select for those species that contribute to hydrolysis and depolymerisation of larger molecules by passing feedstock containing a high concentration of these larger molecules over the perfusion matrix biofilm 17.

Further rounds of biofilm selection can help to select-enrich functional flora and thereby increase the efficiency of the digestion. Transplanting biofilms 17 into new start-up digesters can also be used to extend the process of enrichment. The digester 14 also preferably has a method of mixing the feedstock in order to increase the hydrolysis rate.

Figure 8:
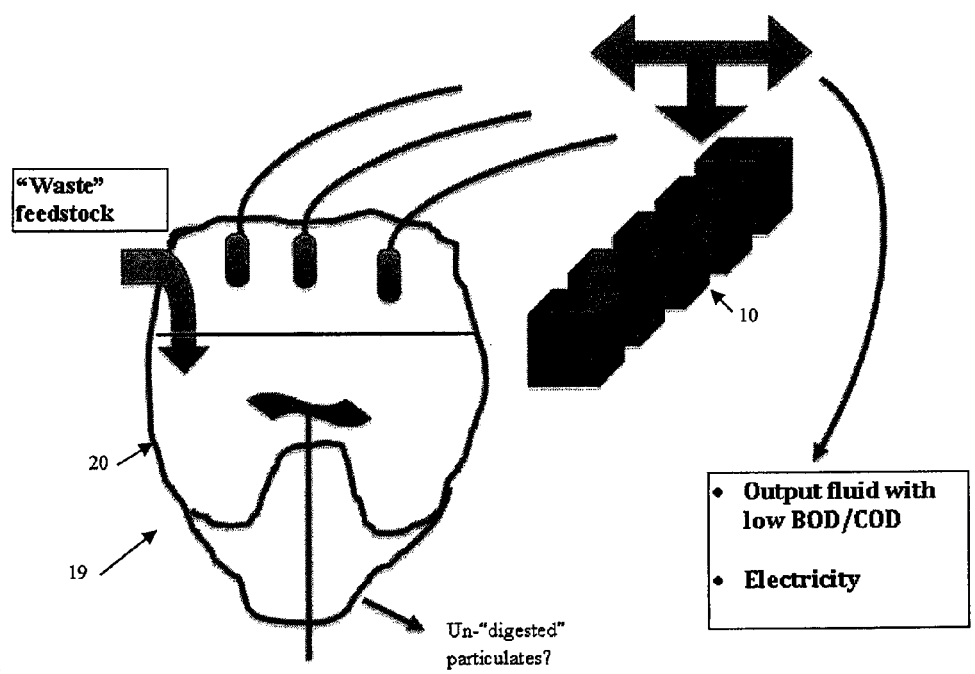
FIG. 8 is a schematic view of an alternative digester that can be incorporated into the cascade arrangement of FIG. 2.

FIG. 8 shows an alternative digester configuration. The digester 19, which receives waste feedstock, includes a stomach 20 that is transparent and flexible. This allows the mixing of the feedstock, that increases the hydrolysis rate, to occur more easily. It also allows sedimentation to be monitored. Sedimentation is important to allow the top layers of fluid digest to be removed and passed onto the next stage. The flexible and transparent stomach 20 allows the height of the weir tube in the digester to be adjusted, thereby maximising the amount of fluid digest that can be removed, without also removing any solid particles. This will increase the efficiency of the power output of the cascade arrangement 10, as the MFCs can more easily digest fluid feedstock that does not contain large particles.

Effect of Air-Gap (Cathode Half-Cell) on MFC Performance

MFCs were made from acrylonitrile-butadiene-styrene (ABS) material. The volumes were 6 mL for the anodes and 6 mL for cathodes, and the electrode surface area was 180 $cm^2$. For each test condition, 6 MFCs were arranged in cascade and were connected electrically in series. Power curves were then produced in order to compare performance under the different test conditions.

The test conditions were as follows:
"Linked": the cathode compartments were fluidically joined with water flowing through;
"Linked+1 Month": the fluidically joined cathode compartments were tested again after 1 month;
"Linked+2.5 m tubing": the cathode compartments were fluidically joined with water flowing through silicone tubes of 2.5 metres in length and 3 mm internal diameter between each compartment;
"Air-gap": the fluidic connection between the 6 cathode compartments was broken and air-gaps of approximately 20-30mm were introduced as separators between the 6 cathodes;
"Air-gap+1 Month": the cathode compartments separated by air-gaps were tested again after 1 month.

Figure 9:
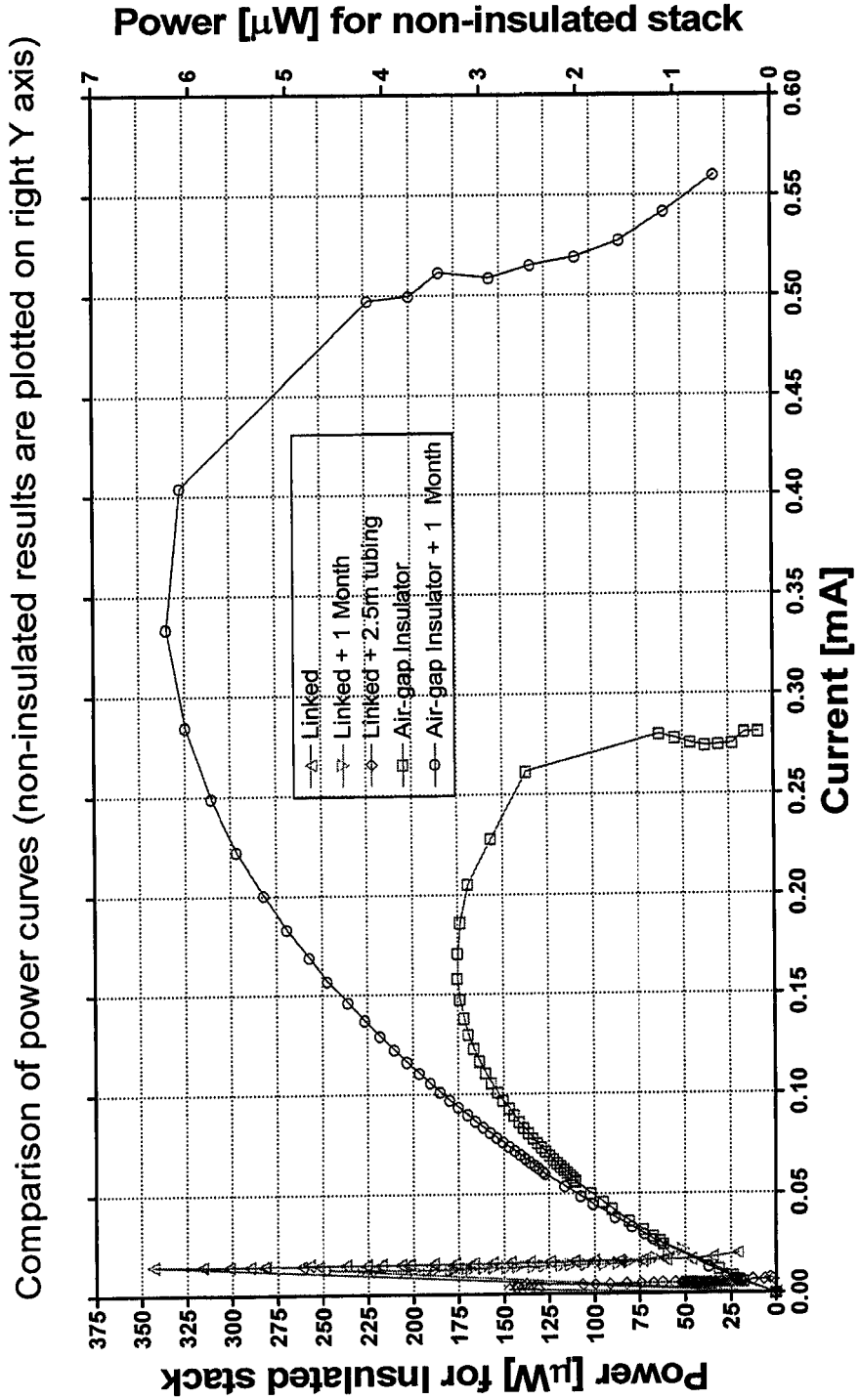
FIG. 9 shows a comparison of power curves produced when a cascade of 6 MFCs were tested in different arrangements.

FIG. 9 illustrates the comparison between power curves produced from the same MFC cascade, under different fluidic configurations. Left Y-axis data are from the experiments when an air-gap was separating the cathodes and the right Y-axis data are from the experiments when the cathodes were fluidically joined. The anodes were separated by air-gaps throughout.

Open triangle symbols (Δ) show the power curve performance from the MFC cascade, when the cathodes were fluidically joined using silicone tubing of 3 mm bore size (length 20-30 mm), producing a peak power output of 6.4 uW. Up-side-down open triangles show the power performance of the same MFC cascade, when the polarisation experiment was performed 1 month later (for the sake of repetition), producing a peak power output of 4.6 uW. The open diamond symbols show the power performance of the same stack/cascade, when the cathodes of the MFCs were fluidically joined with silicone tubing (3 mm bore size) of 2.5 metres in length. The flow rate was sufficient to maintain the interconnecting tubes filled up with liquid (water) and the peak power output was 2.8 uW.

The open square symbols show the power performance from the same stack, when the cathodes were now separated (insulated) by air-gaps of 20-30 mm length. The peak power output from the cascade now under these conditions was 175 uW. The open circle symbols show the power performance of the MFC cascade, with air-gaps separating the cathodes, but the experiment carried out 1 month later (for the sake of repetition). The peak power output from this experiment was 334 uW.

Figure 10:
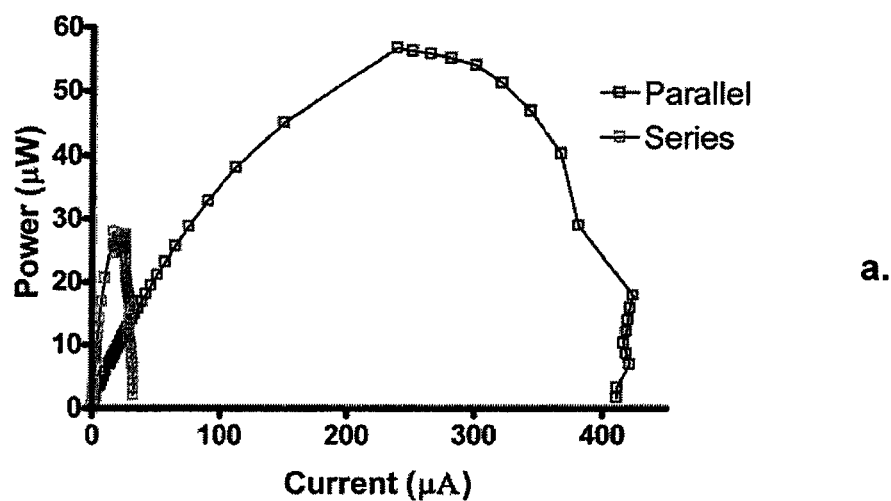
FIG. 10 shows a comparison of power curves produced when a cascade of 7 fluidically linked MFCs were connected electrically in parallel or series. (a) fed 5 mM acetate (b) 10 mM acetate.
Figure 10:
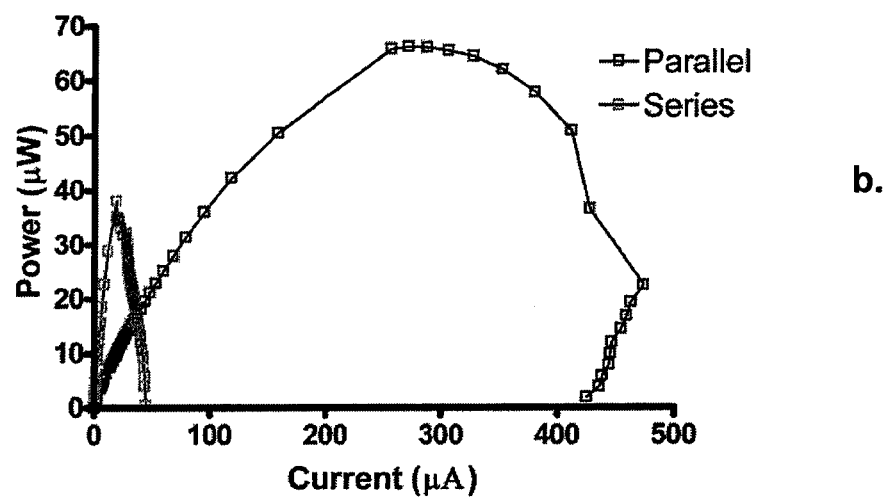

FIG. 10 shows the power curves produced from a cascade of 7 fluidically joined miniature MFCs (non-ceramic). It highlights the considerable difference, due to shunt losses, between series and parallel connection at two concentrations of acetate feedstock.

Figure 11:
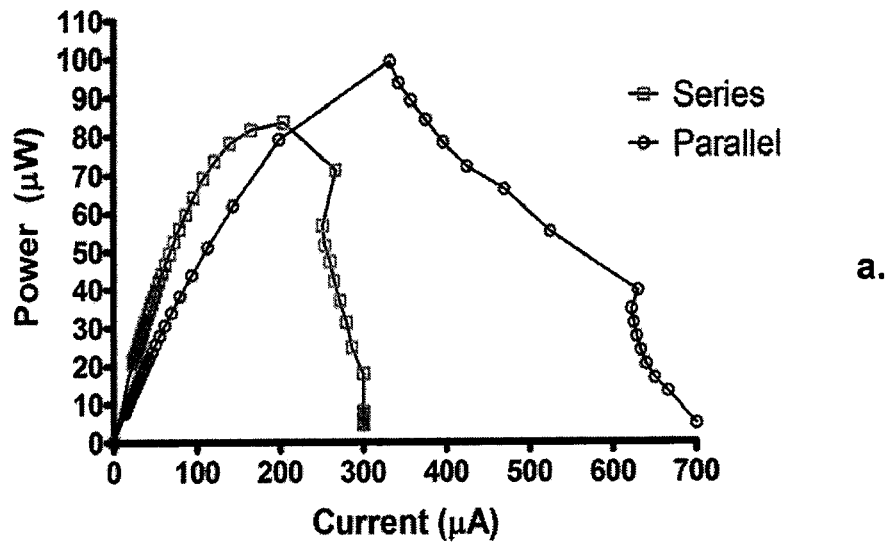
FIG. 11 shows a comparison of power curves produced from a cascade of two ceramic MFCs set up with an air-gap. (a) The anodes in fed-batch (pulse-fed) mode (b) Anodes fed in continuous flow. Feedstock contained 5 mM acetate.
Figure 11:
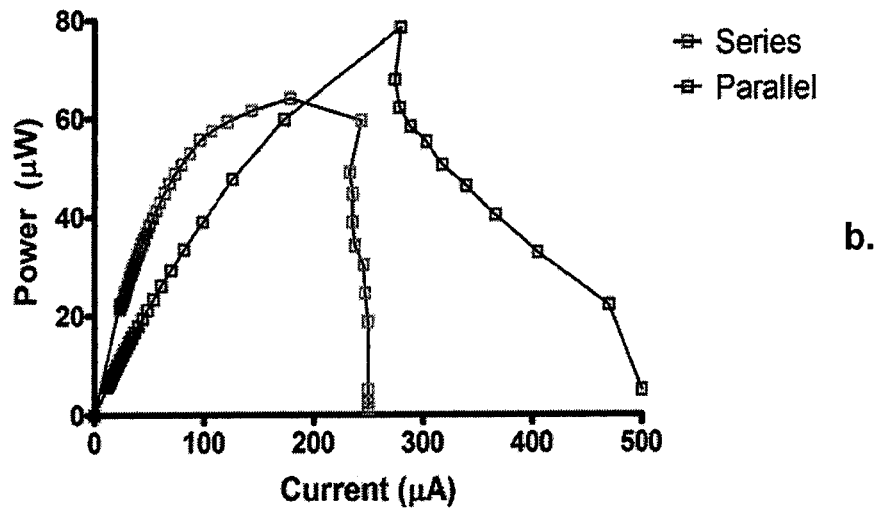

Two MFCs having cylindrical ceramic PEMs were connected electrically in either parallel or series and compared when in fed-batch mode or when operating in continuous flow in a cascade fashion, such that the effluent leaving one MFC fed into the next MFC. These MFCs were set up with an air-gap of 30 mm, thus negating the need for a fluidic link. FIG. 11 shows that performance under the series and parallel connections is far more comparable both when fed-batch and in continuous flow compared to the data produced using fluidically joined MFCs (FIG. 10).

REFERENCES

Ieropoulos et al., 2008, Microbial fuel cells based on carbon veil electrodes: Stack configuration and scalability, *International Journal of Energy Research*

Ieropoulos et al., 2010, Improved energy output levels from small-scale Microbial Fuel Cells, *Bioelectrochemistry* 78: 44-50

Scott and Murano, 2007, A study of a microbial fuel cell battery using manure sludge waste, *J. Chem. Technol. Biotechnol.* 82: 809-817.

Jiang et al., 2011, A pilot-scale study on utilizing multi-anode/cathode microbial fuel cells (MAC MFCs) to enhance the power production in wastewater treatment, *Int. J Hydrogen Energy*, 36: 876-884.

The invention claimed is:

1. An arrangement of multiple microbial fuel cells (MFCs) in which the MFCs are in discontinuous flow communication, in which the discontinuation of the flow communication between adjacent MFCs results from the flow of discrete droplets of fluid bounded completely by free surfaces through an insulating material layer of gas between an upstream MFC anodic chamber and a downstream MFC anodic chamber.

2. The arrangement according to claim 1 in which a weir overflow removes excess feedstock from an anodic chamber and allows the feedstock to flow into the anodic chamber of the next MFC in the arrangement, thereby creating the layer of gas at the top of each anodic chamber.

3. The arrangement according to claim 1 in which the MFCs are pulse fed.

4. The arrangement according to claim 1 in which the MFCs in the arrangement are gravity fed.

5. The arrangement according to claim 1 in which at least one open cathode is used and the open cathode is kept moist using a drip feed.

6. The arrangement according to claim 1 in which at least one cathode is used and in which the at least one cathode is copper plated.

7. The arrangement according to claim 1 wherein at least one MFC comprises a ceramic proton exchange membrane (PEM).

8. The arrangement according to claim 1 in which the makeup of a bacterial community in an upstream MFC is different to that in a downstream MFC.

9. The arrangement according to claim 1 including a digester containing a bacterial community that feeds into the arrangement.

10. The arrangement according to claim 1, in which the MFCs comprise anodic chambers having a volume of between 0.1 ml and 10 ml.

11. A method of operating an arrangement according to claim 1, the method comprising pulse feeding an upstream MFC such that the MFCs in the arrangement are in discontinuous flow communication and varying the arrangement by connecting or disconnecting MFCs in series or parallel in order to suit changing operating requirements.

12. A method of removing potentially harmful compounds from waste in which the waste is passed through the arrangement of claim 1 and in which the waste is derived from bioenergy generation, compost, municipal waste, food and biological waste, landfill leachate, wastewater or urine.

13. A method of electrical power generation in which electricity is generated by passing a feedstock through the arrangement of claim 1.

14. The arrangement of claim 1, in which one open cathode is used on each individual MFC, and the open cathode is kept moist using a drip feed.

15. An arrangement of multiple microbial fuel cells (MFCs) in which the MFCs are in discontinuous flow communication, in which the discontinuation of the flow communication between adjacent MFCs results from the flow of discrete droplets through a gas, in which fluid from an upstream MFC anodic chamber enters an anodic chamber in a downstream MFC via a tube, the tube disposed to leave a layer of gas insulating material between the tube and a top of the upstream anodic chamber.

16. The arrangement of claim 15, wherein the multiple MFCs each have a sealed anodic chamber.

17. The arrangement of claim 15, wherein the tube is a weir tube.

18. An arrangement of multiple microbial fuel cells (MFCs) in which the MFCs are in discontinuous flow communication, in which the discontinuation of the flow communication between adjacent MFCs results from the flow of discrete droplets through an insulating material layer of gas, wherein the discrete droplets are surrounded by the insulating material layer of gas.

* * * * *